United States Patent [19]
Howard et al.

[11] 3,809,871

[45] May 7, 1974

[54] PROGRAMMABLE PHYSIOLOGICAL INFUSION

[75] Inventors: Wayne H. Howard, Mountain View; Donald R. Young, Los Altos Hills; Richard R. Adachi, Menlo Park, all of Calif.

[73] Assignee: The United States of America as represented by the Administrator of the National Aeronautics and Space Administration, Washington, D.C.

[22] Filed: Dec. 1, 1972

[21] Appl. No.: 311,175

[52] U.S. Cl. .......................... 235/151.3, 128/214 E
[51] Int. Cl. ....................... G06f 15/42, A61m 5/14
[58] Field of Search ................... 235/151.3, 151.34; 128/213, 214 E, 214 F

[56] References Cited
UNITED STATES PATENTS

| | | | |
|---|---|---|---|
| 3,043,303 | 7/1962 | Still | 128/214 E |
| 2,690,178 | 9/1954 | Bickford | 128/213 |
| 3,655,095 | 4/1972 | Kienitz | 128/214 E X |
| 3,700,904 | 10/1972 | Stobble et al. | 128/214 E X |

*Primary Examiner*—Malcolm A. Morrison
*Assistant Examiner*—Jerry Smith
*Attorney, Agent, or Firm*—Armand G. Morin, Sr.; Darrell G. Brekke; John R. Manning

[57] ABSTRACT

A programmable physiological infusion device and method are provided wherein a program source, such as a paper tape, is used to actuate an infusion pump in accordance with a desired program. The system is particularly applicable for dispensing calcium in a variety of waveforms.

The invention described herein was made by employees of the United States Government and may be manufactured and used by or for the Government for Governmental purposes without the payment of any royalties thereon or therefor.

5 Claims, 4 Drawing Figures

PROGRAMMABLE PHYSIOLOGICAL INFUSION

BACKGROUND OF THE INVENTION

1. Field of the invention

Programmable infusion system for animal experiments.

2. Description of the prior art

Previous methods of infusion involved a rapid injection in a single dose with a hypodermic syringe or a protracted injection at a constant rate with a pumping device. Neither system provides for the elucidation of the control mechanism in body chemistry, particularly in calcium regulation. Such systems as have been used in the past emphasize only the steady state relationships between the variables of interest while the present invention provides for testing physiologic systems to develop functional relationships from the data obtained. This is particularly important when studying the urinary disposal and tissue distribution of calcium.

SUMMARY OF THE INVENTION

The purpose of this invention is to provide a device which will infuse a substance at a rate which varies in time and following a preprogrammed curve. This invention is a rate programmable pump system and involves the concept of rate programmed infusion.

In the basic bioscience area, such a device is needed to determine the ways in which the body systems are capable of responding to dynamic chemical inputs. It is illuminating to apply a step function waveform infusion to be able to examine, in an animal, the nature of the physiological response and its frequency content. Periodic inputs are necessary for reproducing or simulating natural time-varying inputs and the pulsatile nature of many processes, and to examine the frequency, phase and amplitude characteristics of the responding system. For some biological investigations, less severe inputs which are more consistent with physiological performance may be obtained by ramp inputs. The programmable feature of the device makes it useful for controlling the dispensing of fluid as a function of time.

The present invention is particularly applicable to a system capable of dispensing calcium in a variety of waveforms or forcing conditions. The purpose of this invention is to evaluate the properties of the blood calcium regulatory system in animals. The sinusoidal time-varying input of calcium is one of the functions selected for testing. Historically, the sinusoidal time-varying input has been used for evaluation of the properties of mechanical systems. It is useful in testing for linear characteristics of systems; the magnitude and phase of the response provides numerical values for the damping ratios. And, for the present applications, a comparison of amplitudes and angular frequencies of the blood calcium response with the sinusoidal calcium input provides critical data relevant to the performance and control features of the blood calcium regulatory system.

The component parts of the preferred programmed pumping system consist of the following:
1. computer program and resulting printed paper tape
2. photoelectric tape reader
3. signal conditioner
4. solenoid operated piston pump such as a Harvard lambda pump.

When the system is in operation, the curve representing the desired waveform for infused calcium is read as marks on a continuous loop of paper tape. The marks are printed by a computer on the paper tape in such a way that a pulse modulated curve results at the output when the tape is run through a photoelectric reader at a constant speed. After a mark on the paper tape is sensed, the signal is conditioned to operate the solenoid equipped piston pump that pumps a desired infusion substance into a vein of an animal.

DESCRIPTION OF THE PREFERRED EMBODIMENTS

Figure 1:
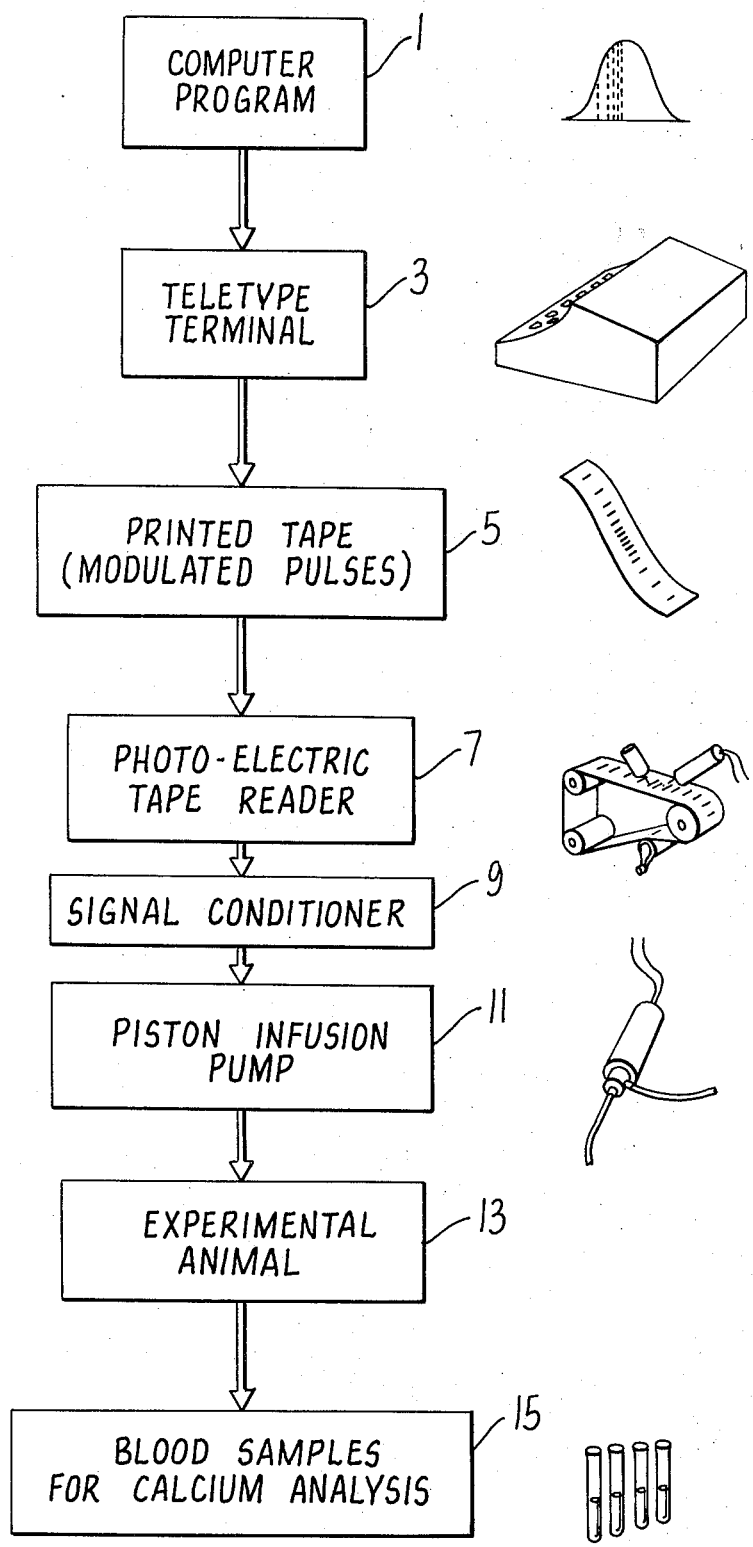
FIG. 1 is a flow diagram showing the steps performed in a preferred embodiment of the invention.

Referring now to FIG. 1 of the drawing, a flow diagram is shown of a preferred method of practicing the present invention. In accordance with this embodiment, a computer program at 1 is developed to an output desired waveform such as a sinusoidal wave. The method of doing this is set forth in detail later. The output of the program is fed into a teletype terminal 3 which provides a printed tape 5 having thereon a series of pulses or lines wherein the distance between the pulses represent the number of pump strokes necessary to provide the desired area under the curve. A photoelectric reader 7 is employed to read the pulses and the pulses are amplified to a suitable level in a signal conditioner 9 and the pulses fed to an infusion pump 11. The preferred photoelectric tape reader is photoswitch type 22DJ4 made by Electronics Corporation of America, Cambridge, Massachusetts; the preferred signal conditioner is a conventional pulse multiplier designed to give 1–10 output pulses for each input pulse; and the preferred infusion pump is a Harvard lambda pump made by the Harvard Apparatus Company of Dover, Massachusetts. The infusion pump is connected to an experimental animal 13 and blood samples are periodically taken and analyzed at 15. Normally urine samples would also be taken and analyzed but this is not illustrated.

Figure 2:
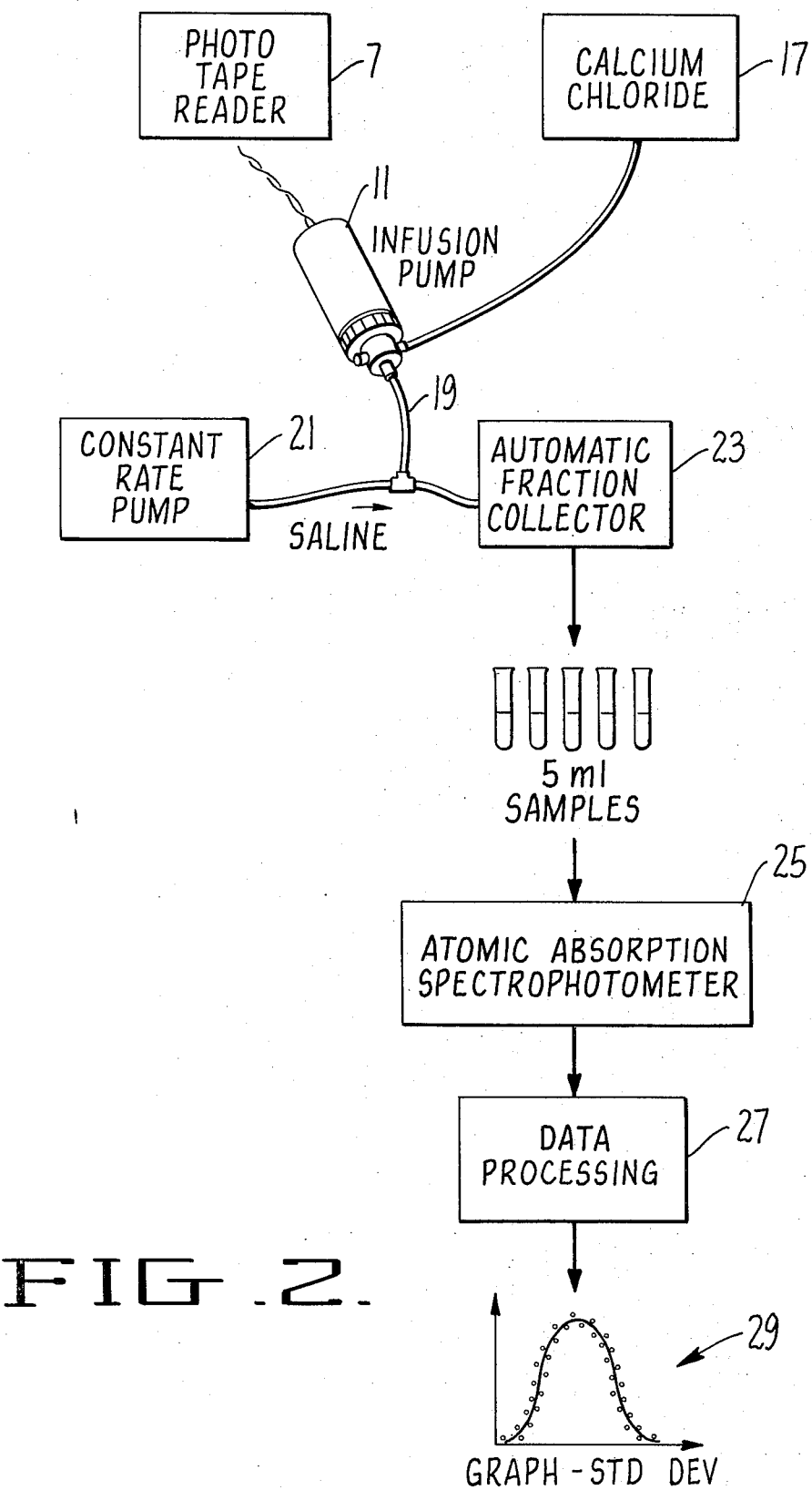
FIG. 2 is a similar flow diagram showing a simulator for testing the accuracy of the present invention.

In FIG. 2 a simulator is shown for testing the system of the present invention. Here the phototape reader 7 feeds pulses to the piston actuated infusion pump 11. The infusion pump is connected to a source of a solution of calcium chloride 17 and the effluent from the pump is taken through line 19 and mixed with a constant flow of saline solution from a source 21 and passed to an automatic fraction collector 23 where the solution is divided into samples and passed to an atomic absorption spectrophotometer 25 for the analysis of calcium. The data from the spectrophotometer is processed at 27 and plotted as a curve 29. On the graph, the values of calcium in each of the samples have been plotted. In one practical test of the equipment, wherein 5 milliter samples were collected from the automatic fraction collector, the variation between the observed and expected calcium content of each fraction was only ± 0.0005 mg.

Figure 3:
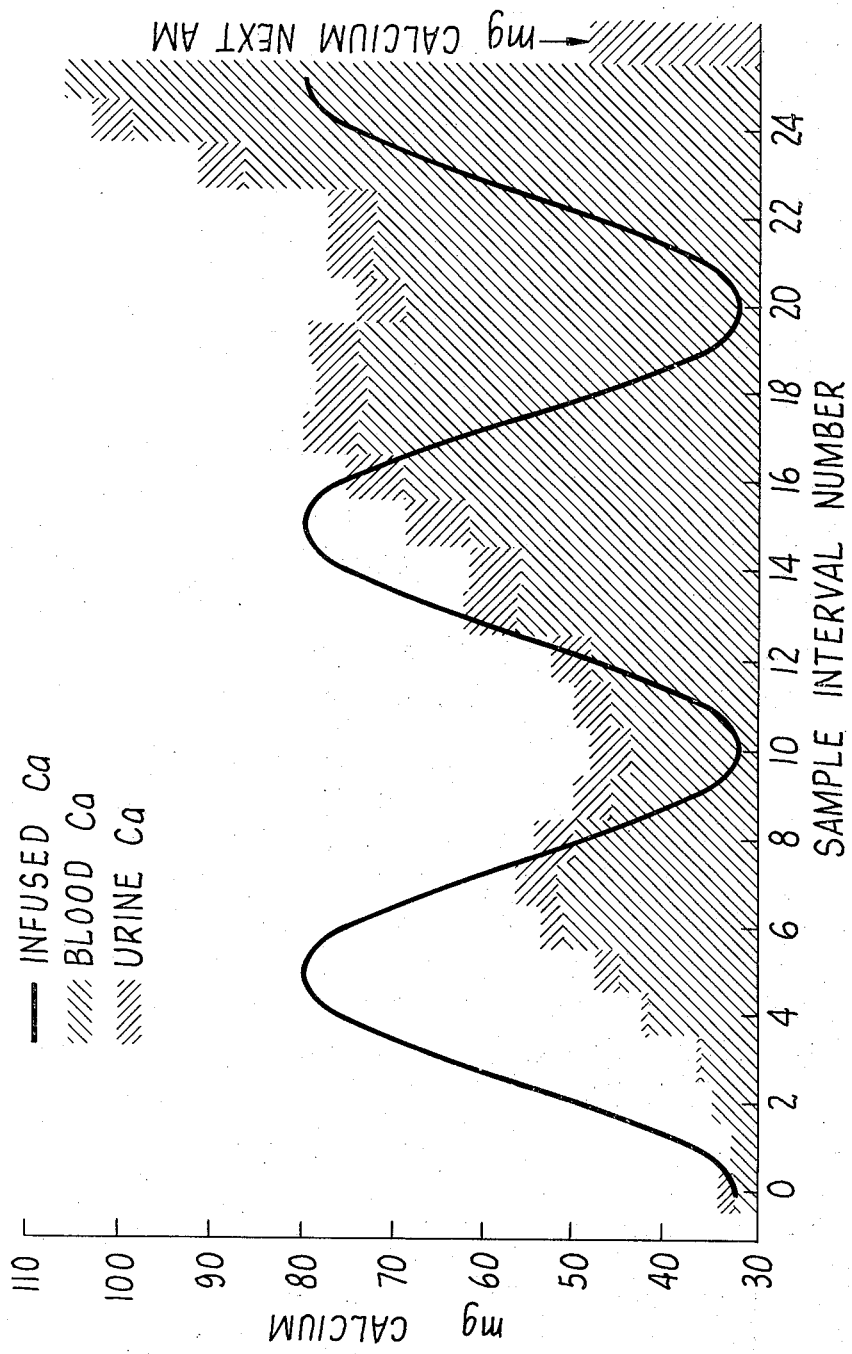
FIG. 3 is a graph illustrating the effect of sinusoidal injection of calcium on blood calcium and urine calcium.
Figure 4:
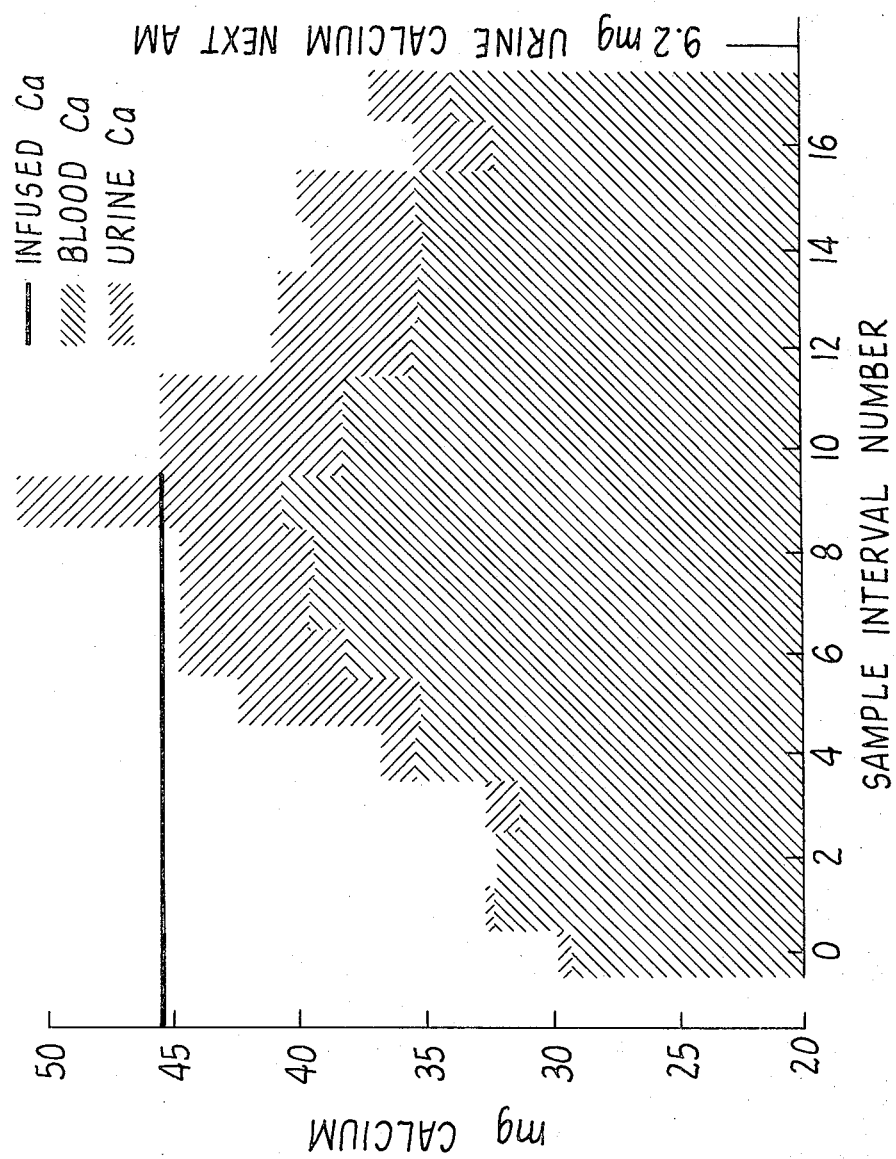
FIG. 4 is a similar diagram showing the results obtained by the prior art wherein calcium is infused at a steady rate.

FIGS. 3 and 4 illustrate the results obtained with the present invention.

For the tests on anesthetized Rhesus monkeys, calcium glucoheptonate was infused into a saphenous vein through a polyethylene Intracath. Blood and urine samples were taken at regular timed intervals and analyzed for calcium with an atomic absorption spectrophotometer. Blood was withdrawn from the leg opposite to the infusion; urine was collected through a no. 6 French ureteral catheter. FIG. 3 shows the total blood serum and urine calcium response to a sinusoidal infusion of 215 mg of calcium per hour for a total of 2.5 hr.

To indicate damping and phase shifting in the blood response, the sinusoid line, representing the calcium infused in mg for each blood and urine sampling period, has been included. For each sampling period, the total mg of calcium in the urine is shown on top of the serium calcium level. This displays the total appearance of calcium in the blood and urine in relationship to the infused calcium.

FIG. 4 shows the result of a steady-rate infusion (square wave) of 135 mg of calcium over 2 hr. with the subsequent fall of serum calcium after termination of the infusion, and again the urine calcium is shown on top of the serum calcium level; the solid line indicates the infusion duration.

The mode of operation has been described in detail in regard to the specific problem of calcium homeostasis, although other applications are evident. Frequently, under both normal and disordered metabolic conditions, blood calcium level is relatively constant. In humans, increased dietary calcium, intravenous administration of nominal levels of calcium, or increased bone resorption and osteopenia do not necessarily modify blood calcium level. Therefore, calcium is controlled within a small range. A method is required to provide a means to better evaluate calcium regulation. The method required would need to describe the dynamics of the regulatory system, and to define the effect of calcium level on the secretory function of glands associated with calcium regulation. This would provide information of value for diagnosis, prevention, or therapy.

In carrying out a preferred method of practicing the present invention, a paper tape in a continuous loop must first be made. This tape has marks scribed on it at varying intervals depending on the desired waveform needed for infusion. The paper tape may be made by hand using a pen and ruler to scribe the marks. The intervals on the tape between the marks are computed.

A faster method to make the tape is to use a computer and a teletype terminal as is shown in FIG. 1. The line feed on the terminal is used to space along the tape and a dash to print the marks. The computer is faster and permits a number of tapes to be made in a short time. It is necessary also to be able to make tapes of different length and different numbers of marks to adjust the time of the run and the total volume of fluid infused. These require that new tapes be continuallly produced.

A paper punched tape, such as is used with teletypes and computers along with suitable tape handling equipment, may be substituted for the photoelectric tape and drive. The paper punched tape may be made on a computer and teletype terminal in a similar manner as the photoelectric tape, using the nul character to advance a space on the tape and suitable ascil characters to punch in the eight channels. This would provide for up to eight channels to carry waveforms, providing multiple channel operation and simultaneous infusion of several substances or for just the convenience of being able to switch easily from one waveform to another with single channel operation.

The punched tape is read on a reader, such as the Friden pulse driven tape reader, which has the feature of advancing on the command of a pulse or a switch closure. This provides for control of the speed of the advancing tape and thus control the time of the run. A typical tape advancement speed is about 1 character per second. Another unit is needed to be provided to generate appropriate pulses or switch closures to the reader.

Paper punched tape does not provide for ease of correction as does the photoelectric tape which needs only a pen or white paint. It is more difficult to make tapes with a free form wave with punched tape. With the photo tape free form waves can be scribed by hand with a pen.

Magnetic tape may also be used to substitute for the photoelectric tape and drive with suitable electronic interfacing. As in the case of the paper punched tape, this is more difficult to make corrections or free form waves.

We claim:

1. A method for studying body response to dynamic pulsatile chemical inputs which includes infusing a substance into a test animal over a period of time for raising and lowering the concentration of said substance according to a sustained and predetermined wave form, comprising the steps of recording a desired program on an information carrying medium, wherein said program includes a pulse-modulated wave form coded on said medium, sensing the pulses on said medium, feeding said sensed pulses to a solenoid piston infusion pump whereby said solenoid activated pump infuses predetermined amounts of said substance into said animal, said amounts corresponding to and being dependent upon the length and shape of said coded pulse-modulated wave form.

2. The method of claim 1 wherein said wave form is a sinusoidal wave and said test substance is calcium.

3. An apparatus for infusing a substance into an animal for raising and lowering the concentration of said substance at a predetermined rate and in a sustained and predetermined wave form comprising in combination:
   a. a record of a desired infusion program, said program including a pulse-modulated wave form coded on an information carrying medium,
   b. means for reading said pulse-modulated wave form record and for converting said record into a series of pulses,
   c. means for converting said pulses into a series of uniform increments of a test substance, and
   d. means for injecting said increments of a test substance into an experimental animal.

4. The apparatus of claim 3 wherein said program is in the form of a paper tape having a series of dashes thereon wherein the distance between said dashes represents the time between desired infusion increments.

5. The apparatus of claim 4 wherein a photoelectric reader is employed to read said tape and a solenoid-type piston pump is employed to translate said dashes into increments of test substance.

* * * * *